United States Patent
Ray et al.

(10) Patent No.: US 10,402,986 B2
(45) Date of Patent: Sep. 3, 2019

(54) UNSUPERVISED VIDEO SEGMENTATION

(71) Applicant: Facebook, Inc., Menlo Park, CA (US)

(72) Inventors: Benjamin Ray, Palo Alto, CA (US); Anurag Ranjan, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 77 days.

(21) Appl. No.: 15/849,341

(22) Filed: Dec. 20, 2017

(65) Prior Publication Data

US 2019/0188863 A1    Jun. 20, 2019

(51) Int. Cl.
| | | |
|---|---|---|
| *G06T 7/215* | (2017.01) | |
| *G06T 7/246* | (2017.01) | |
| *G06T 7/33* | (2017.01) | |
| *G06N 20/00* | (2019.01) | |

(52) U.S. Cl.
CPC ............ *G06T 7/215* (2017.01); *G06N 20/00* (2019.01); *G06T 7/251* (2017.01); *G06T 7/344* (2017.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 10,268,913 B2* | 4/2019 | Lim | .................. | G06K 9/00973 |
| 2011/0317888 A1* | 12/2011 | Simon | .................. | G06K 9/6207 |
| | | | | 382/128 |
| 2013/0114942 A1* | 5/2013 | Yu | .......................... | H04N 5/272 |
| | | | | 386/278 |
| 2014/0126769 A1* | 5/2014 | Reitmayr | .................. | G06T 7/73 |
| | | | | 382/103 |
| 2014/0372175 A1* | 12/2014 | Jain | ...................... | H04W 76/12 |
| | | | | 705/7.31 |
| 2015/0287203 A1* | 10/2015 | Baumberg | ............. | H04N 5/232 |
| | | | | 382/103 |
| 2018/0231653 A1* | 8/2018 | Pradeep | ............. | G06K 9/00362 |

(Continued)

OTHER PUBLICATIONS

Lai, Wei-Sheng, Jia-Bin Huang, and Ming-Hsuan Yang. "Semi-supervised learning for optical flow with generative adversarial networks." Advances in Neural Information Processing Systems. 2017. (Year: 2017).*

(Continued)

*Primary Examiner* — Andrae S Allison
(74) *Attorney, Agent, or Firm* — Baker Botts L.L.P.

(57) ABSTRACT

In one embodiment, a method includes a computing system accessing a first training data comprising a first image and a second image and an associated optical flow estimation. The system may input (1) the first image into a first machine-learning model configured to generate a first output and (2) the optical flow estimation into a second machine-learning model configured to generate a second output. The first output of the first machine-learning model is associated with first image segments of a predetermined number, and the second output of the second machine-learning model is associated with transformations of the predetermined number. The first output, the transformations, and the first image are configured to generate an estimated image. The system trains the first machine-learning model and the second machine-learning model based on at least a comparison of the estimated image and the second image.

20 Claims, 5 Drawing Sheets

(56) References Cited

U.S. PATENT DOCUMENTS

2018/0232571 A1* 8/2018 Bathiche ............ G06K 9/00369
2018/0286055 A1* 10/2018 Lim ....................... G06T 7/215

OTHER PUBLICATIONS

Dosovitskiy, Alexey, Jost Tobias Springenberg, and Thomas Brox. "Learning to generate chairs with convolutional neural networks." Proceedings of the IEEE Conference on Computer Vision and Pattern Recognition. 2015. (Year: 2015).*

Dosovitskiy, Alexey, et al. "Flownet: Learning optical flow with convolutional networks." Proceedings of the IEEE international conference on computer vision. 2015. (Year: 2015).*

Bideau, Pia, et al. "The best of both worlds: Combining cnns and geometric constraints for hierarchical motion segmentation." Proceedings of the IEEE Conference on Computer Vision and Pattern Recognition. 2018. (Year: 2018).*

Ren, Zhe, et al. "Unsupervised deep learning for optical flow estimation." Thirty-First AAAI Conference on Artificial Intelligence. 2017. (Year: 2017).*

P. Luc, N. Neverova, C. Couprie, J. Verbeek, and Y. Lecun. Predicting Deeper into the Future of Semantic Segmentation. arXiv:1703.07684v3, Aug. 8, 2017.

J. V. Amersfoort, A. Kannan, M. Ranzato, A. Szlam, D. Tran, and S. Chintala. Transformation-Based Models of Video Sequences. arXiv:1701.08435v2, Apr. 24, 2017.

H. Wang, C. Schmid. Action Recognition with Improved Trajectories. In IEEE, Dec. 2013.

C. Feichtenhofer, A. Pinz, and R. Wildes. Spatiotemporal Residual Networks for Video Action Recognition. In NIPS, 2016.

T. Xue, J. Wu, K. Bouman, and W. Freeman. Visual Dynamics: Probabilistic Future Frame Synthesis via Cross Convolutional Networks. In Advances in Neural Information Processing Systems 29, 2016.

J. Yang, A. Kannan, D. Batra, and D. Parikh. LR-GAN: Layered Recursive Generative Adversarial Networks for Image Generation. In arXiv:1703.01560v3, Aug. 2, 2017.

E. H. Adelson. Layered Representations for Vision and Video. In IEEE, 1995.

D. Sun, J. Wulff, E. B. Sudderth, H. Pfister, and M. J. Black. A Fully-Connected Layered Model of Foreground and Background Flow. In IEEE, Oct. 3, 2013.

* cited by examiner

UNSUPERVISED VIDEO SEGMENTATION

TECHNICAL FIELD

This disclosure generally relates to video or image processing, and more specifically to systems and methods for automatically segmenting images and video frames.

BACKGROUND

Scenes captured through a camera or other imaging devices may include identifiable objects, such as persons, trees, cars, street signs, clouds, animals, micro-organisms, embryo (via ultrasound imaging), etc. While a human viewing a video or image may readily be able to identify objects captured therein, the same cannot be said of machines or computers. To a computer, a given image, without more, is a collection of pixels that represent colors, and a video is an ordered sequence of images (frames). Therefore, general-purpose computers are unable to discern objects within an image/video, absent human inputs and/or special image/video processing.

SUMMARY OF PARTICULAR EMBODIMENTS

The subject matter described herein relates to systems and methods for automatically determining, within images or videos, segments that may correspond to real-world objects. In particular embodiments, to determine such segments in images or videos, a computer system may be trained on sequential frames using unsupervised machine learning. Conceptually, since objects captured in sequential images (e.g., frames in a video) are separate entities in reality, their movements are usually independent relative to one another. For example, in a video of a car driving down a street with a tree in the background, the car and the tree would each have separate movements. Particular embodiments described herein take advantage of this observation and use distinct movement patterns as signals for determining segments within an image that correspond to distinct real-world objects. Since objects may be automatically detected based on their movement patterns as captured in sequential images, a machine-learning model for detecting objects may be trained using unlabeled sequential images. Once trained, the machine-learning model may be used to determine segments within images/videos that correspond to distinct objects. The ability to automatically segment an image into distinct objects has wide applicability, including, e.g., semantic feature learning, semantic segmentation, motion estimation, etc. For example, if semantic segmentation is desired, the embodiments described herein may be used to pre-process images/videos to detect segments that correspond to objects, and a subsequent semantic-labeling process may be used to classify the segments-rather than the raw pixel data-as being particular objects (e.g., a person, a tree, a car, etc.).

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

The subject matter described herein relates to systems and methods for automatically determining, within images or videos, segments that may correspond to real-world objects. In particular embodiments, to segment images or frames in videos, a computer system may be trained on sequential frames using unsupervised machine learning. Conceptually, since objects captured in sequential images (e.g., frames in a video) are separate entities in reality, their movements are usually independent relative to one another. For example, in a video of a car driving down a street with a tree in the background, the car and the tree would each have separate movements. Particular embodiments described herein take advantage of this observation and use distinct movement patterns as signals for segmenting an image into parts that correspond to distinct real-world objects. Since objects may be automatically detected based on their movement patterns as captured in sequential images, a machine-learning model for detecting objects may be trained using unlabeled sequential images. Once trained, the machine-learning model may be used to determine segments within images/videos that correspond to distinct objects.

In particular embodiments, a machine-learning model may be configured to output or predict the subsequent frame in a video sequence given the current frame (or vice versa). In this model, an image (which may be a frame) may be represented as layers of image segments with corresponding optical flow representations from the current image to the subsequent image.

Figure 1A:
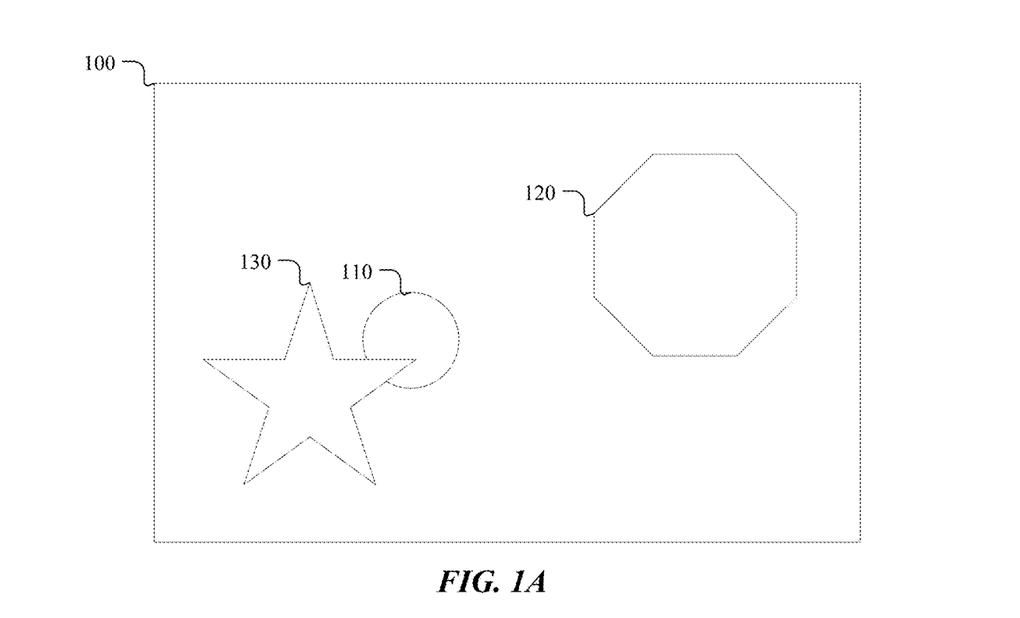
FIGS. 1A and 1B illustrate examples of image sequences in which objects relocate.
Figure 1B:
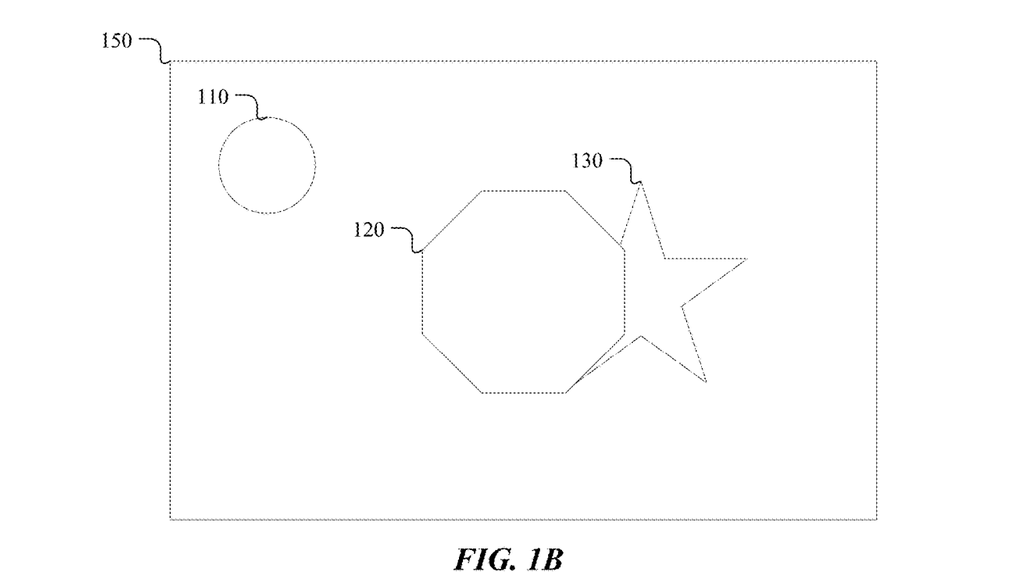

In particular embodiments, an image, denoted by I, may be decomposed into multiple segments. Each segment may be of arbitrary size and shape but continuous (e.g., every pixel in a segment may be interconnected by pixels in the segment). Segments may be viewed as image layers that can move on top of each other. FIGS. 1A and 1B, for example, illustrate two images in a sequence (e.g., frames in a video). FIG. 1A illustrates an example image 100 with three segments: a circle 110, an octagon 120, and a star 130 covering a portion of the circle 110. FIG. 1B illustrates another image 150 in the sequence. In image 150, the objects, relative to their potions in the first image 110, moved to a different location. In particular, the circle 110 has moved to the upper left corner of the image 150, and the octagon 120 and star 130 have moved towards the center of the image 150, with the octagon 120 now covering a portion of the star 130. The optical flow of these objects from their respective positions in the first image 100 to their respective positions in the second image 150 may be used to determine distinct object segments.

In particular embodiments, a machine-learning model may be configured to segment an input image I into C image layers (or segments), each of which is denoted by $L_c$. Conceptually, piecing the image layers together may yield the original image:

$$I = \sum_C L_c$$

In particular embodiments, each image layer $L_c$ may be represented by applying a masking image $m_c$ to the original image I. For example, a mask may be represented as a matrix of 1's and 0's corresponding to pixels in the image, where 1's indicate pixels that are included in the image layer $L_c$ and 0's indicate pixels that are excluded from the image layer $L_c$. Thus, applying an element-wise multiplication of a mask with the original image would yield the image layer $L_c$. This may be represented by:

$$L_c = m_c \circ I$$

Thus, I may be represented as:

$$I = \sum_C m_c \circ I$$

As previously discussed, objects in a scene may have independent motion from each other and therefore may each be represented by a moving image layer. Since in particular embodiments a machine-learning model may be trained on image sequences in which motion may be captured, the model may include representations of optical flow of an image. The term "optical flow" as used herein refers to motion of pixels in one frame with respect to corresponding pixels in another frame in a temporal sequence. For example, optical flow may be represented as a matrix of elements, each of which being associated with a corresponding pixel of an image. For instance, each element in the matrix may indicate translation information in the x and y directions that, when applied to the corresponding pixel in one image, indicates where the pixel would be in the other image in the sequence. More formally, for example, $I_1$ (x+u,y+v)=$I_2$ (x,y), where (u, v) may be defined as the optical flow.

In particular embodiments, the optical flow of the pixels within each image layer $L_c$ may be represented as a rigid transformation z, which may be represented as an affine vector. In particular embodiments, a rigid transformation $z_c$ may include information that captures translation, rotation, and shear data. For example, 2-dimensional translation may be represented by two numbers, $t_x$ and $t_y$, respectively representing x-direction and y-direction translations. For example, translation of a pixel at (x, y) may be performed by x'=x+$t_x$ and y'=y+$t_y$, with (x', y') being the new coordinate of the pixel. As another example, rotation by Θ degrees may be performed by x'=x cos(Θ)−y sin (Θ) and y'=x sin(Θ)+y cos (Θ). As another example, the object may also be scaled in the x and y dimensions by, respectively, scaling factors $s_x$ and $s_y$. For example, scaling may be performed by x'=x $s_x$ and y'=y $s_y$. As yet another example, shearing may be performed based on four numbers, $h_a$, $h_b$, $h_c$, and $h_d$, used in the following transformation formulae: x'=$h_a$ x cos(Θ)−$h_b$ y sin (Θ) and y'=$h_c$ x sin(Θ)+$h_d$ y cos (Θ). Any combination of transformation types may be used. For example, in an embodiment where $z_c$ is configured to include translation, rotation, and shearing, it may consist of the following values: $t_x$, $t_y$, Θ, $h_a$, $h_b$, $h_c$, and $h_d$.

In particular embodiments, each of the rigid transformations $z_c$ may be converted into a corresponding warping operator $w_c$ for applying the affine transformation. For example, the warping operator may be a matrix, where each element in the matrix includes transformation information based on $z_c$ that is to be applied to the associated pixel. The warping operator may allow for more degrees of freedom, but since its values derive from $z_c$, which may be a rigid transformation (e.g., translation, rotation, shearing, etc.), it is constrained by the types of transformations encoded in $z_c$. One benefit of training a model (e.g., network $N_M$, as described below) to output $z_c$ rather than $w_c$ directly is that $z_c$, being in a much smaller, finite space, serves as a regularizer for the model and allows the model to be more efficiently and effectively solved, and that objects generally undergo rigid/affine motion.

In particular embodiments, a machine-learning network architecture is configured to learn feature representations for objects in an image based on their motion. An example of a machine-learning network architecture is provided in FIG. 2. In the machine-learning network architecture shown, training is based on a sequence of two images: image $I_1$ 240 and image $I_2$ 210. As used herein, $I_2$ represents an image that occurs after image $I_1$ in the sequence. The time or frame gap between the two images may be selected so that changes in object positions from one image to the other are sufficiently pronounced. For example, in a scene with fast moving objects, $I_1$ and $I_2$ may be sequential images. On the other hand, in a scene with slow moving objects, there may be a time gap or frame gap between the images (e.g., there may be 1, 2, or 5 frames between the two images). From these images, an optical flow estimation u 220 may be generated using conventional techniques known to a person of ordinary skill in the art.

Figure 2:
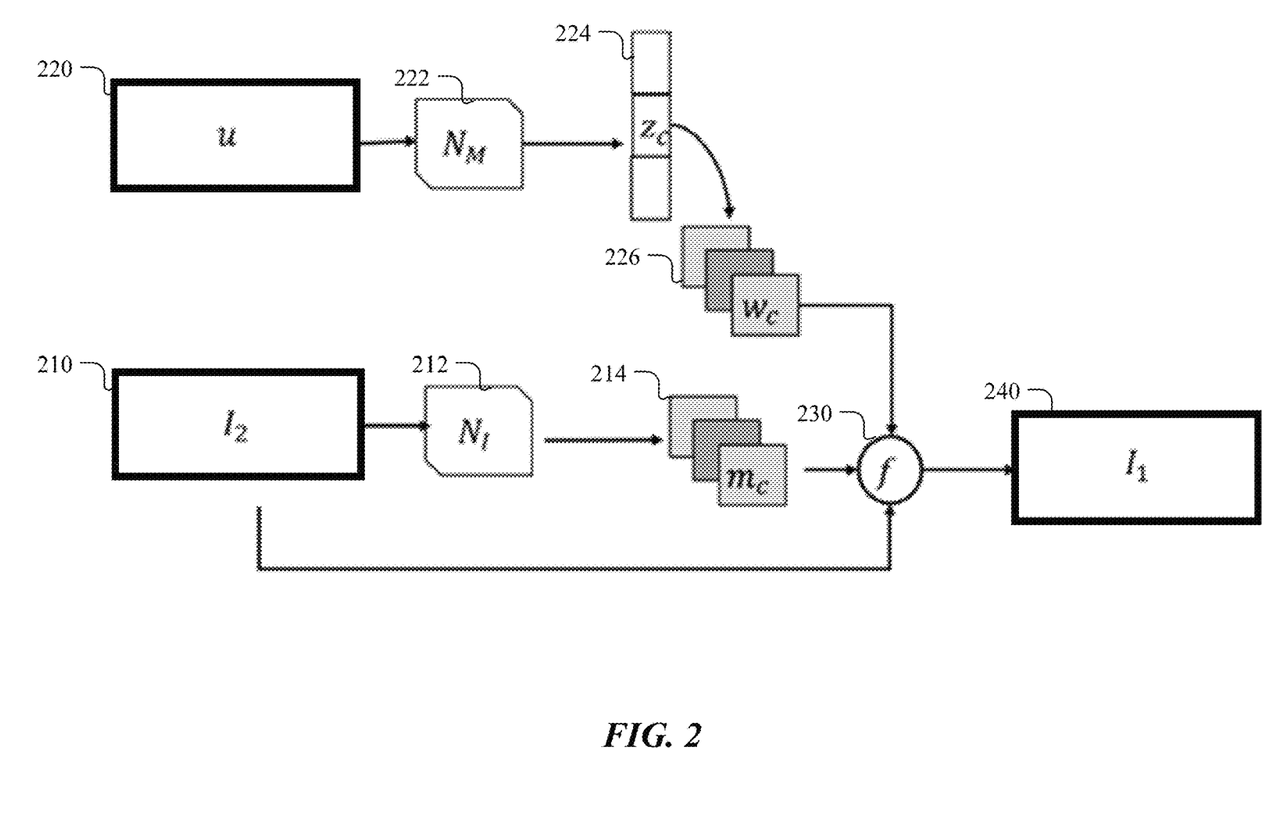
FIG. 2 illustrates an example of a machine-learning network architecture for segmenting images.

In particular embodiments, the image $I_2$ 210 and optical flow u 220 are configured as input for predicting/outputting another image $I_1$ 240 in a video sequence. In particular embodiments, the machine-learning architecture comprises two neural networks, $N_1$ 212 and $N_M$ 222, for processing the image $I_2$ 210 and the optical flow u 220, respectively. As such, the image $I_2$ 210 and the optical flow u 220 are represented and processed independently. In particular embodiments, the two networks $N_1$ 212 and $N_M$ 222 may be used in the model to predict image masks $m_c$ 214 and motion transformations $w_c$ 226, respectively. For example, the neural network $N_1$ 212 may be configured to take as input the second frame $I_2$ 220 of a sequence $\{I_1, I_2\}$ and predict/output masks $m_c$ 214 for each of C (a predetermined number, such as 8, 15, 20, etc.) image layers. For example, the machine-learning architecture may be configured to predict C=8 segments within an image. As such, the neural network $N_1$ 212 may be configured to predict 8 masks $m_c$ 214, each of which may be applied to the image $I_2$ 210 to obtain the corresponding image layers/segments $L_c$, as described above. In particular embodiments, the network $N_M$ 222 may be configured to take as input the optical flow u 220 associated with the image $I_2$ 210 and predict/output rigid transformations $z_c$ for each of the C image layers $L_c$. Continuing the example where C=8, the network $N_M$ 222 may in particular embodiments output a vector encompassing 8 rigid transformations $z_c$ 224, one for each of the image layers $L_c$. In particular embodiments, each of the rigid transformations $z_c$ 224 may be represented using warping operators $w_c$ 226.

In particular embodiments, the machine-learning architecture may comprise a composition function $f$ 230, which may be defined to use the predicted masks $m_c$ 214 and the transformations $z_c$ 224 (or the corresponding warping operators $w_c$ 226) to generate an estimated image $I_1'$. For example, the function $f$ 230 may be configured to apply each warping operator $w_c$ 226 to the corresponding image layer/segment $L_c$ obtained using mask $m_c$ 214. The combination of the results may then be output as the estimated image $I_1'$. Based on this model architecture, the model may be trained to simultaneously learn the neural networks $N_I$ 212 and $N_M$ 222 for predicting $m_c$ 214 and $z_c$ 224, respectively.

In particular embodiments, the composition function $f$ 230 may be defined to take as input an image $I_2$ 210, a set of masks $m_c$ 214 that define the C image layers of $I_2$ 210, and a set of transformations vectors $z_c$ 224 that define the transformations of the image layers in $I_2$ to corresponding layers in the output image $I_1'$. Using these inputs, the composition function $f$ may output an image $I_1'$, which is an estimate of the image $I_1$ 240, by individually warping and combining the image layers.

In particular embodiments, the composition function may be configured to warp each of the layers and then blend them together, defined as follows:

$$I_1' = f(I_2, m_C, w_C) = \sum_C w_i(m_i) \circ w_i(I_2)$$

Conceptually, for each image layer i of the C image layers, the function $f$ 230 applies a corresponding warping operator $w_i$ and transforms the corresponding mask $m_i$ (i.e., the operation denoted by $w_i(m_i)$), applies that warping operator $w_i$ on the original image $I_2$ (i.e., the operation denoted by $w_i(I_2)$), and extracts only the warped segment/layer from the warped original image (i.e., the operation denoted by applying element-wise product of $w_i(m_i)$ and $w_i(I_2)$). The extracted layers are added together by pixels, which produces a blending effect in regions with overlapping layers. Blending may lead to blurring artifacts at occlusion boundaries.

Instead of blending, particular embodiments define a composition function $f$ 230 in a layer-aware manner where layers are conceptually pasted on top of each other recursively. The estimation of $I_1'$ may be based on a recursive function, which may be defined as:

$I_1' = w_1(m_1) \circ w_1(I_2)$;

for i from 2 to C:

$I_1' = w_i(m_i) \circ w_i(I_2) + (1 - w_i(m_i))I_1'$;

end

At a high level, the recursive function warps both the mask and the original image and extracts only the pixels selected by the warped mask using $(w_i(m_i) \circ w_i(I_2))$. The recursive function initializes the predicted image $I_1'$ to be the element-wise product of (1) the warped mask $m_1$, which is warped using the corresponding warping operator $w_1$, and (2) the warped original image $I_2$, which is also warped using the warping operator $w_1$. Then during each iteration for each of the remaining C image layers, the predicted image $I_1'$ is updated to reflect an added image layer. For example, in each iteration i, an updated predicted image $I_1'$ may be the sum of the current image layer i being processed and a select portion of the previously processed image layers. For instance, the current image layer i may be the element-wise product of (1) the warped mask $m_i$, which is warped using the corresponding warping operator $w_i$, and (2) the warped original image $I_2$, which is also warped using the warping operator $w_i$. The rest of the updated predicted image $I_1'$ that is not covered by the image layer i, as specified by $1 - w_i(m_i)$, is recursively defined by the partially-estimated image layers determined in the previous iterations. Conceptually, this achieves the effect of placing each warped image layer onto a canvas one at a time in a layered fashion, with the later placed layer covering the previously placed layer(s). The proper ordering of the layers would be learned during the training process, since an incorrect order of the layering would result in an estimated $I_1'$ that deviates from the ground truth image, which in this case is $I_1$ 240.

In particular embodiments, the machine-learning architecture may be trained using a training data set, with each training data in the set comprising a sequence of images (e.g., $I_1$ and $I_2$). Once trained, the neural networks $N_I$ 212 and $N_M$ 222 would be optimized for generating an estimated image $I_1'$ that is close to the known "truth," which is $I_1$ 240 in this case. In particular embodiments, the loss function that is to be optimized (or minimized) in training may be defined as:

$$E = E_L + E_S = \|I_1 - I_1'\| + \sum \nabla m_c$$

where $E_L$, which corresponds to $\|I_1 - I_1'\|$, represents the loss or discrepancy between the estimation $I_1'$ and the target or truth $I_1$ 240 in the training data. $E_S$, which corresponds to sum $(\nabla m_c)$, represents a spatial smoothness constraint on the obtained masks $m_c$. By minimizing the gradients of $m_c$ (taken as derivative in a spatial way), which conceptually enforces neighboring pixels to have similar values, the trained $N_I$ would be optimized to produce masks that are more continuous, rather than scattered. The training process may continue iteratively through a sufficiently large number of training data (e.g., image sequences, which need not be labeled) until a predetermined convergence criterion is met (e.g., E being sufficiently small). It should be appreciated that since the training data may be unlabeled, the machine-learning process may be unsupervised, which greatly enhances the robustness and simplicity of the training as no costly data labeling is required.

In particular embodiments, the machine-learning architecture may be configured to take as input a previous image $I_1$ and predict a subsequent image $I_2$. This approach is intuitive, as the model is configured to predict a future scene based on the current scene. One computational challenge with this approach is that pixels of different image layers may be transformed or warped onto the same destination pixel during training. For example, if one pixel is black and the other pixel is white, and both pixels are transformed onto the same destination pixel, ambiguity would be introduced since it would be unclear which color should occupy that pixel. In other embodiments (e.g., FIG. 2), the machine-learning architecture may be configured to take as input a subsequent image $I_2$ and predict a previous image $I_1$. In doing so, the warping information that is to be predicted would represent an inverse or backward warping, which indicates where each pixel in $I_2$ came from in $I_1$. As such, each pixel in $I_2$ would only map to one pixel in $I_1$, thereby resolving any ambiguities.

Once the model has been trained, the trained neural network $N_I$ 212 would be configured to segment an image (without semantic meaning) corresponding to perceived objects, and the training neural network $N_M$ 222 would be configured to output corresponding transformations for the objects. In particular embodiments, the trained neural network $N_I$ 212 may be used to solve semantic segmentation problems (e.g., identifying an object as being a person, tree, etc.). In particular embodiments, the trained neural network $N_I$ 212 may be used to effectively label training images as having segments that are likely distinct objects. In particular embodiments, a trained neural network $N_I$ 212 using the process described above may be considered as being pre-trained and may be fine-tuned by further training it on data where semantic information is known. The training process, for example, may be based on supervised learning where objects within images are labeled (e.g., car, tree, etc.). Through training, the neural network $N_I$212 or another network may be trained to automatically segment and identify objects in a given image. Experiments have shown that semantic-prediction models trained using this approach outperforms conventional training where a semantic-prediction model is trained from scratch based on supervised learning, when training samples are low/small.

In particular embodiments, the semantic training process for particular types of images may be trained using training images in the same distribution to enhance performance. For example, if a machine-learning model is intended for detecting road conditions, the training data used for training may be traffic images (e.g., driving images with cars and lanes). In particular embodiments, the same pre-trained network $N_I$ may be refined using different types of training images to tailor the resulting network for particular semantic segmentation tasks. In particular embodiments, the pre-trained network $N_I$ may also be trained during the pre-training process using images in the same distribution as the intended semantic segmentation tasks. Since the pre-training process is unsupervised, doing so is simple as no human labeling of the underlying training data is needed.

In particular embodiments, the training may be based on one or a small set of training data to tailor the network for the particular image or type of image. Since the pre-trained model already knows how to identify objects, the subsequent semantic training further teaches it how to label the objects with semantic information, so a much smaller training dataset would suffice.

Figure 3:
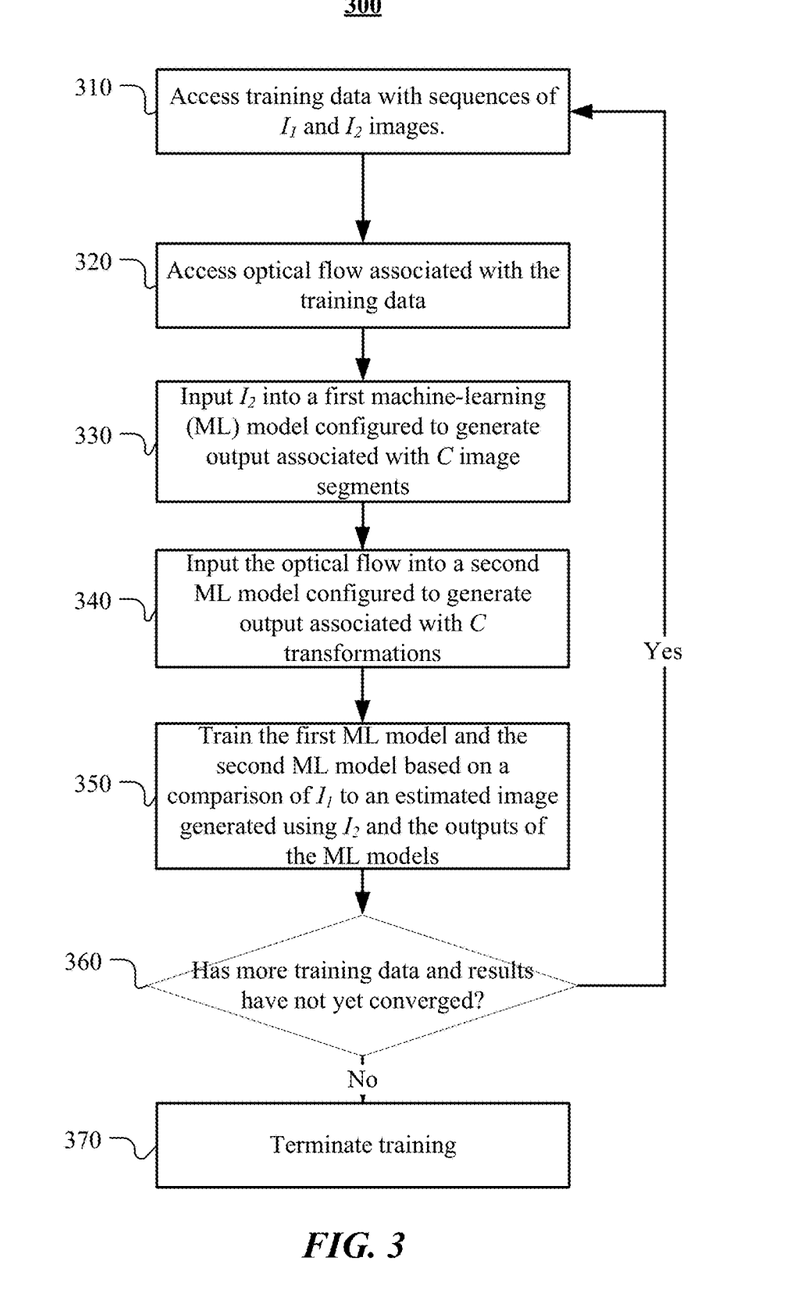
FIG. 3 illustrates an example method for training a machine-learning model to segment images.

FIG. 3 illustrates an example method 300 for training a machine-learning model to segment images. The method may begin at step 310, where a computing system may access a first training data in a set of training data, the first training data comprising a sequence of images with a first image and a second image. In particular embodiments, the training data may be labeled. At step 320, the system may access an optical flow estimation associated with the first training data. The optical flow estimation may be generated based on one or both of the first image and the second image. At step 330, the system may input the first image into a first machine-learning model configured to generate a first output, and at step 340 the system may input the optical flow estimation into a second machine-learning model configured to generate a second output. The first output of the first machine-learning model may be associated with first image segments of a predetermined number. The second output of the second machine-learning model may be associated with transformations of the predetermined number. The first output, the transformations, and the first image may be configured to generate an estimated image. At step 350, the system may train the first machine-learning model and the second machine-learning model based on at least a comparison of the estimated image and the second image. At step 360, the system may determine whether additional training data exist in the set of training data. If additional training data exists and the training has not converged yet (e.g., based on a threshold of a loss function result), the system may iteratively train the machine-learning models using additional training data. Otherwise, the training terminates at step 370. As described above, once trained, the first machine-learning model may be further trained to identify semantic information using, e.g., supervised learning. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for training a machine-learning model to segment images, including the particular steps of the method of FIG. 3, this disclosure contemplates any suitable method for training a machine-learning model to segment images, including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
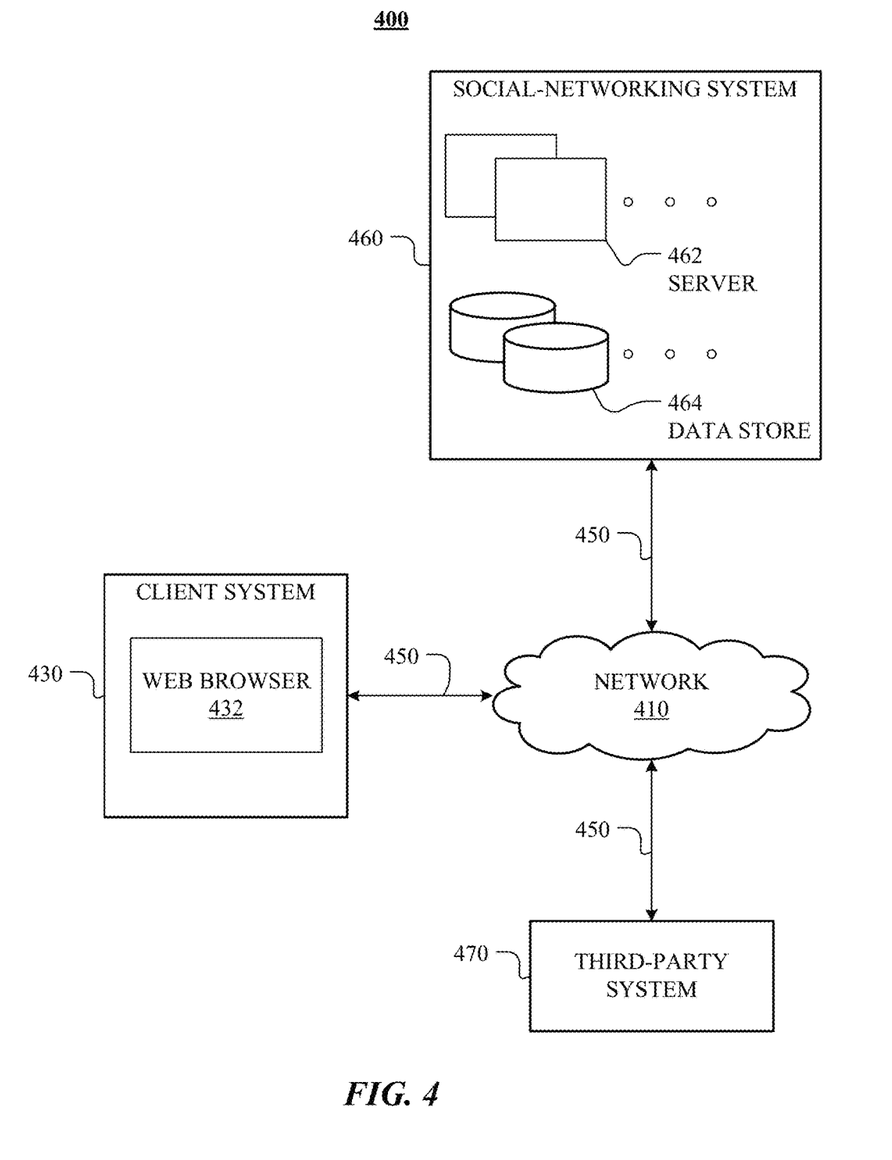
FIG. 4 illustrates an example network environment associated with a social-networking system.

FIG. 4 illustrates an example network environment 400 associated with a social-networking system. Network environment 400 includes a client system 430, a social-networking system 460, and a third-party system 470 connected to each other by a network 410. Although FIG. 4 illustrates a particular arrangement of client system 430, social-networking system 460, third-party system 470, and network 410, this disclosure contemplates any suitable arrangement of client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple client system 430, social-networking systems 460, third-party systems 470, and networks 410.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

In particular embodiments, client system 430 may be an electronic device including hardware, software, or embedded logic components or a combination of two or more such components and capable of carrying out the appropriate functionalities implemented or supported by client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 430. A client system 430 may enable a network user at client system 430 to access network 410. A client system 430 may enable its user to communicate with other users at other client systems 430.

In particular embodiments, client system 430 may include a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 430 may enter a Uniform Resource Locator (URL) or other address directing the web browser 432 to a particular server (such as server 462, or a server associated with a third-party system 470), and the web browser 432 may generate a Hyper Text Transfer Protocol (HTTP) request and communicate the HTTP request to server. The server may accept the HTTP request and communicate to client system 430 one or more Hyper Text Markup Language (HTML) files responsive to the HTTP request. Client system 430 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 460 may be a network-addressable computing system that can host an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 410. As an example and not by way of limitation, client system 430 may access social-networking system 460 using a web browser 432, or a native application associated with social-networking system 460 (e.g., a mobile social-networking application, a messaging application, another suitable application, or any combination thereof) either directly or via network 410. In particular embodiments, social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 464.

In particular embodiments, social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. Social-networking system 460 may provide users of the online social network the ability to communicate and interact with other users. In particular embodiments, users may join the online social network via social-networking system 460 and then add connections (e.g., relationships) to a number of other users of social-networking system 460 to whom they want to be connected. Herein, the term "friend" may refer to any other user of social-networking system 460 with whom a user has formed a connection, association, or relationship via social-networking system 460.

In particular embodiments, social-networking system 460 may provide users with the ability to take actions on various types of items or objects, supported by social-networking system 460. As an example and not by way of limitation, the items and objects may include groups or social networks to which users of social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 460 or by an external system of third-party system 470, which is separate from social-networking system 460 and coupled to social-networking system 460 via a network 410.

In particular embodiments, social-networking system 460 may be capable of linking a variety of entities. As an example and not by way of limitation, social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating social-networking system 460. In particular embodiments, however, social-networking system 460 and third-party systems 470 may operate in conjunction with each other to provide social-networking services to users of social-networking system 460 or third-party systems 470. In this sense, social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 460 also includes user-generated content objects, which may enhance a user's interactions with social-networking system 460. User-generated content may include anything a user can add, upload, send, or "post" to social-networking system 460. As an example and not by way of limitation, a user communicates posts to social-networking system 460 from a client system 430. Posts may include data such as status updates or other textual data, location information, photos, videos, links, music or other similar data or media. Content may also be added to social-networking system 460 by a third-party through a "communication channel," such as a newsfeed or stream.

In particular embodiments, social-networking system 460 may include a variety of servers, sub-systems, programs, modules, logs, and data stores. In particular embodiments, social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 460 may also include suitable components such as network interfaces, security mechanisms, load balancers, failover servers, management-and-network-operations consoles, other suitable components, or any suitable combination thereof. In particular embodiments, social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 460 to one or more client systems 430 or one or more third-party system 470 via network 410. The web server may include a mail server or other messaging functionality for receiving and routing messages between social-networking system 460 and one or more client systems 430. An API-request server may allow a third-party system 470 to access information from social-networking system 460 by calling one or more APIs. An action logger may be used to receive communications from a web server about a user's actions on or off social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from client system 430 responsive to a request received from client system 430. Authorization servers may be used to enforce one or more privacy settings of the users of social-networking system 460. A privacy setting of a user determines how particular information associated with a user can be shared. The authorization server may allow users to opt in to or opt out of having their actions logged by social-networking system 460 or shared with other systems (e.g., third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Figure 5:
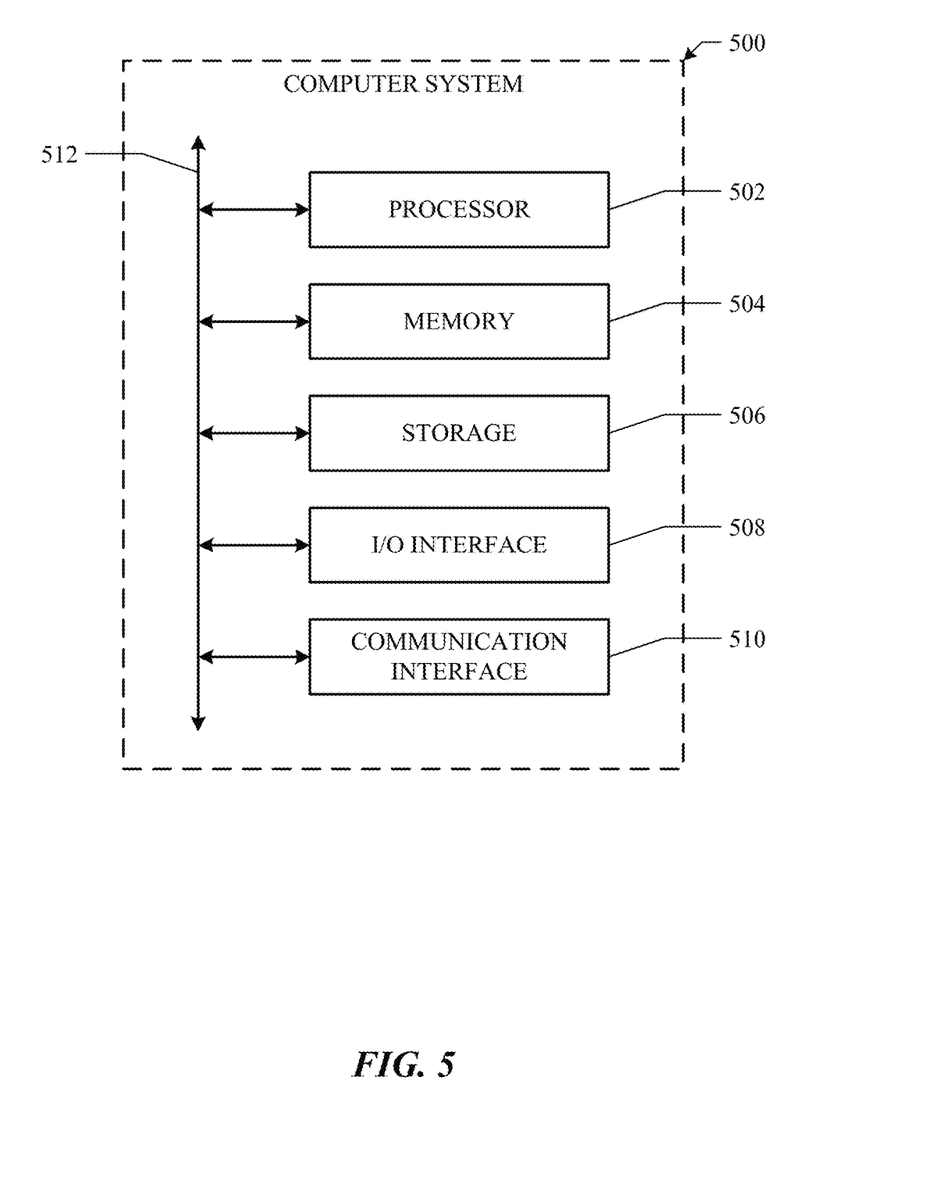
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by a computing system, accessing a first training data in a set of training data, the first training data comprising a sequence of images with a first image and a second image;
by the computing system, accessing an optical flow estimation associated with the first training data;
by the computing system, inputting (1) the first image into a first machine-learning model configured to generate a first output and (2) the optical flow estimation into a second machine-learning model configured to generate a second output, wherein the first output of the first machine-learning model is associated with first image segments of a predetermined number, wherein the second output of the second machine-learning model is associated with transformations of the predetermined number, wherein the first output, the transformations, and the first image are configured to generate an estimated image; and
by the computing system, training the first machine-learning model and the second machine-learning model based on at least a comparison of the estimated image and the second image;
wherein the trained first machine-learning model is configured to segment images into the predetermined number of segments.

2. The method of claim 1, wherein:
the first image precedes the second image in the sequence of images; or
the second image precedes the first image in the sequence of images.

3. The method of claim 1, further comprising:
by the computing system, generating the optical flow estimation using the first image and the second image.

4. The method of claim 1, wherein the first output of the first machine-learning model comprises masks of the predetermined number, wherein applying the masks to the first image generates, respectively, the first image segments of the predetermined number.

5. The method of claim 4, wherein the estimated image is generated by:
transforming each of the first image segments using an associated one of the transformations; and
combining the transformed first image segments.

6. The method of claim 5, wherein the transforming of each of the first image segments comprises:
applying the associated transformation to the associated mask;
applying the associated transformation to the first image; and
applying the transformed associated mask to the transformed first image.

7. The method of claim 5, wherein the combining of the transformed first image segments comprises sequentially layering the transformed first image segments.

8. The method of claim 1, wherein the transformations of the predetermined number are rigid transformations, wherein the rigid transformations are respectively associated with the first image segments.

9. The method of claim 1, wherein the transformations of the predetermined number are warping operators, wherein the warping operators are respectively associated with the first image segments.

10. The method of claim 9, wherein the second output of the second machine-learning model comprises rigid transformations of the predetermined number, wherein the rigid transformations are used to respectively generate the warping operators.

11. The method of claim 1, wherein the first image is a combination of the first image segments.

12. The method of claim 1, further comprising:
by the computing system, accessing a second training data in a second set of training data, the second training data comprising a third image with one or more segments, wherein at least one of the one or more segments is associated with an identified object;
by the computing system, further training the trained first machine-learning model using the second training data;
wherein the further-trained first machine-learning model is configured to segment and identify objects in images.

13. One or more computer-readable non-transitory storage media embodying software that is operable when executed by a computing system to cause the computing system to perform operations comprising:
accessing a first training data in a set of training data, the first training data comprising a sequence of images with a first image and a second image;
accessing an optical flow estimation associated with the first training data;
inputting (1) the first image into a first machine-learning model configured to generate a first output and (2) the optical flow estimation into a second machine-learning model configured to generate a second output, wherein the first output of the first machine-learning model is associated with first image segments of a predetermined number, wherein the second output of the second machine-learning model is associated with transformations of the predetermined number, wherein the first output, the transformations, and the first image are configured to generate an estimated image; and
training the first machine-learning model and the second machine-learning model based on at least a comparison of the estimated image and the second image;
wherein the trained first machine-learning model is configured to segment images into the predetermined number of segments.

14. The media of claim 13, wherein the first output of the first machine-learning model comprises masks of the predetermined number, wherein applying the masks to the first image generates, respectively, the first image segments of the predetermined number.

15. The media of claim 14, wherein the estimated image is generated by:
transforming each of the first image segments using an associated one of the transformations; and
combining the transformed first image segments.

16. The media of claim 15, wherein the transforming of each of the first image segments comprises:
applying the associated transformation to the associated mask;
applying the associated transformation to the first image; and
applying the transformed associated mask to the transformed first image.

17. A system comprising:
one or more processors; and one or more computer-readable non-transitory storage media coupled to one or more of the processors and comprising instructions operable when executed by one or more of the processors to cause the system to perform operations comprising:

accessing a first training data in a set of training data, the first training data comprising a sequence of images with a first image and a second image;

accessing an optical flow estimation associated with the first training data;

inputting (1) the first image into a first machine-learning model configured to generate a first output and (2) the optical flow estimation into a second machine-learning model configured to generate a second output, wherein the first output of the first machine-learning model is associated with first image segments of a predetermined number, wherein the second output of the second machine-learning model is associated with transformations of the predetermined number, wherein the first output, the transformations, and the first image are configured to generate an estimated image; and training the first machine-learning model and the second machine-learning model based on at least a comparison of the estimated image and the second image;

wherein the trained first machine-learning model is configured to segment images into the predetermined number of segments.

18. The system of claim 17, wherein the first output of the first machine-learning model comprises masks of the predetermined number, wherein applying the masks to the first image generates, respectively, the first image segments of the predetermined number.

19. The system of claim 18, wherein the estimated image is generated by:

transforming each of the first image segments using an associated one of the transformations; and combining the transformed first image segments.

20. The system of claim 19, wherein the transforming of each of the first image segments comprises:

applying the associated transformation to the associated mask;

applying the associated transformation to the first image; and applying the transformed associated mask to the transformed first image.

* * * * *